United States Patent Office 3,221,259
Patented Nov. 30, 1965

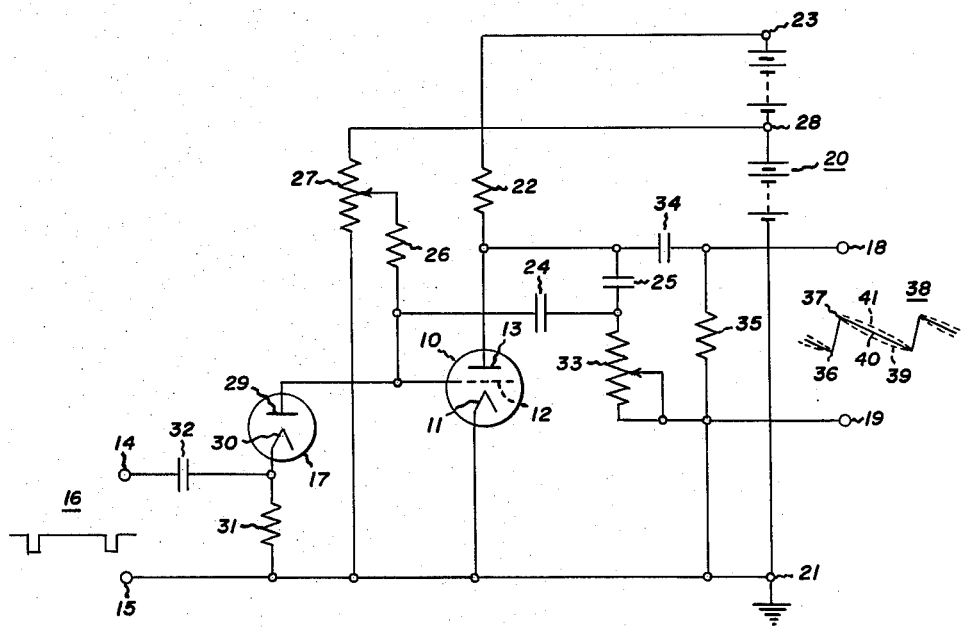
INVENTOR:
WILLIAM C. BATES,
BY *Julius J. Zachalsky*
HIS ATTORNEY.

3,221,259
SAWTOOTH WAVEFORM GENERATOR EMPLOYING ADDITIONAL RC NETWORK TO PROVIDE LINEARIZATION
William C. Bates, Clay, N.Y., assignor to General Electric Company, a corporation of New York
Filed Oct. 24, 1963, Ser. No. 318,539
5 Claims. (Cl. 328—184)

The present invention relates, in general, to saw-toothed wave generators and, in particular, relates to a highly linear saw-toothed wave generator, the output of which is shaped in a manner to compensate for any distortion introduced by capacitive coupling the output thereof to the point of utilization.

Such saw-toothed wave generators have numerous applications and in particular are useful as vertical sweep generators in television receivers. The vertical sweep frequency of a television receiver is relatively low. Accordingly, in order to provide a linear sweep voltage at the deflection plates of a kinescope from a linear source with the necessary unidirectional potential isolation, large coupling capacitors are necessary. Such capacitors are not only costly but they occupy appreciable space, particularly in systems requiring high deflection voltages, for example light valve projection systems.

Accordingly, a primary object of the present invention is to provide a saw-toothed wave generator of highly linear output at the point of utilization without requiring large coupling capacitances.

In carrying out the present invention in an illustrative embodiment thereof there is provided a saw-toothed wave generator, utilizing the well-known Miller Effect in an electron discharge device, in which the time rate of change in the output thereof is controlled by the grid to plate capacitor of the circuit in conjunction with a grid impedance returned to a suitable high potential point. A voltage wave, similar to the voltage wave appearing at the output of a capacitive coupling network coupling the output of the generator to the point of utilization, is applied through the grid to plate capacitor of the circuit to the grid to perform the output obtained from the electron discharge device thereby compensating for distortion introduced by the coupling network.

The novel features believed characteristic of the invention are set forth in the appended claims. The invention itself, together with further objects and advantages thereof may best be understood by reference to the following description taken in conection with the accompanying drawing in which:

The figure is a schematic diagram of a saw-toothed wave generator circuit in accordance with the present invention.

Referring now to the figure there is shown a saw-toothed wave generator including an electron discharge device 10 having a cathode 11, a grid 12 and an anode or plate 13, a pair of input terminals 14 and 15 to which may be coupled the vertical synchronizing pulses 16 derived from the synchronizing circuits of a television receiver, a unilaterally conducting device 17 connected in circuit betwen the input terminals and the grid cathode path of the electron discharge device 10 for synchronizing the output thereof, a pair of output terminals 18 and 19, and a source of unidirectional potential 20 including a plurality of positive potential points. The cathode 10 of the electron discharge device is connected to ground reference point 21 on the source 20. The anode 13 is connected through an anode load impedance 22 to positive potential point 23 on the source 20. The grid 12 is connected through a sweep frequency determining capacitor 24 and capacitor 25 on a wave forming network to the anode 13. The grid 12 is also connected through a fixed resistor 26 and to the center of potentiometer 27, one end of which is connected to ground, the other end of which is connected to another positive potential point 28 on the source 20. The grid 12 is also connected to the anode 29 of the unilaterally conducing device 17, the cathode 30 of which is connected through a load impedance 31 to ground. Input terminal 14 is connected through a coupling capacitor 32 to the cathode 30 of the unilaterally conducting device. The other input terminal 15 is connected to the ground. The coupling network, consisting of capacitor 34 and a resistor 35 is connected in series circuit between the anode 13 and cathode 11. The output terminals are connected across the resistor 35. The wave shaping network consisting of capacitor 25 and variable resistance 33 is also connected in shunt between the anode and cathode of the device 10. The resistance 33 is made variable to produce a variable preshaped output as desired. The time rate of change of the saw-toothed wave output is varied by varying the position of the center tap of potentiometer 27.

Consider the operation of the circuit of the figure under steady state operating condition during the occurrence of a negative pulse of voltage between the input terminals 14 and 15. The grid 12 is connected in circuit with the source of the input pulse through diode 17, and the potential thereon becomes sufficiently negative to render the device 12 non-conductive. During the cutoff of the device 12 the capacitance 24 is charged through load resistance 22 and the conduction path of diode 17 to substantially the voltage at point 28 of the source 20. The time constant of charging path is determined principally by the values of resistance 22 and capacitance 24 and is selected to be of the order of the duration of the pulse so that during this interval the capacitance 24 can be charged to substantially its full value. After the occurrence of the pulse the diode 17 becomes non-conductive and grid 12 is disconnected from the pulse source connected to the input terminals 14 and 15. The potential at the grid 12 rises rapidly to its cutoff potential and initiates conduction in the device 12. Concurrently, the capacitance 24 begins to discharge through its discharge path consisting of resistance 26, a portion of the potentiometer 27, and anode load 22, and the capacitance 25. As the grid 12 rises from its cutoff potential, the current through the anode load resistance increases by a large factor causing the anode 13 to drop in potential. Concurrently, the capacitance 24 discharges through its discharge circuit at a rate determined primarily by the values of the capacitance 24 and the resistance 26. Resistance 26 is many times larger than any of the other resistances in the circuit. The capacitance 24 discharges for a period of time until the next pulse appears at input terminates 14 and 15 at which point capacitor 24 is again charged to its full value. The time constant of the discharge path determined principally by the value of resistance 26 and capacitance 24 is selected to be quite large in comparsion to the period of time between succeeding pulses whereby only a small portion of the discharge curve of voltage versus time of the discharge circuit is utilized in the operation of the circuit to minimize non-linearity in the output. The rate of discharge of the capacitor 24 is also controlled by the position of the center arm on the potential divider 27. At high positive voltages at the center arm the capacitor 24 discharges at a higher rate than at low voltages. Such means enables the slope of the sawtooth output to be controlled with precision within certain limits.

When it is desired to develop a sawtooth wave of low frequency, for example 60 cycles, for use as the vertical sweep voltage of a television receiver it is necessary to use large coupling capacitors to couple such voltage onto the vertical deflection plates of the image display device of the receiver. In addition, as such deflection voltages are usually quite large, the capacitance used must not only be large but the capacitor also must be able to withstand high voltages. Physically a capacitor having such requirements would be bulky and expensive. In accordance with the present invention the need for large capacitances for such purposes is eliminated. In the absence of wave shaping network consisting of capacitor 25 and variable resistor 33, the output voltage wave appearing at the output terminals would have a declining portion such as shown in dotted line 39. The wave shaping network supplies a voltage between grid 12 and ground which is in phase opposition to the wave appearing at the anode of the device, and accordingly preforms the output so as to produce a wave having the declining voltage portion such as shown in solid line 40 in the output wave form. With an excessive amount of compensation the output wave portion can be made to assume the shape shown in the upper dotted line 41 in the output wave form. The proper amount of compensation is provided by variation in the variable resistance 33. Initially, the capacitor 25 and the capacitor 34 are selected to be approximately equal, and similarly an intermediate value of the resistance 33 and the value of resistance 35 are selected to be equal. With the intermediate value of resistance 33 in circuit exact compensation is obtained. With a smaller value of resistance over compensation results and with a large value of resistance under compensation results. The change of the output wave form 38 from a condition of over compensation to one of under compensation is useful in connection with display devices, i.e., cathode ray tubes, used in television receivers in which the deflection sensitivity is not uniform over the deflection range of the display device. Such variation in sensitivity may be compensated by producing an output wave which departs in the appropriate direction from a linear relationship.

While the invention has been described in specific embodiments, it will be appreciated that many modifications may be made by those skilled in the art, and we intend by the appended claims to cover all such modifications as fall within the true spirit and scope of the invention.

What I claim as new and desire to secure by Letters Patent of the United States is:

1. A saw-toothed wave generator comprising an electron discharge device including a cathode, a grid and an anode, a source of energizing potential having a positive terminal, an anode load impedance, said load impedance being connected between said anode and the positive terminal of said source, a first capacitor connected in circuit between said grid and said anode, a first resistor connected between said grid and the positive terminal of said source, means connected in shunt with the grid-cathode path of said discharge device for periodically biasing the potential of said grid with respect to said cathode beyond cutoff for short intervals of time, whereby a saw-tooth wave is developed between said anode and cathode electrodes, a second capacitor and a second resistor connected in series circuit between said anode and said cathode, said first capacitor having the end adjacent said anode connected to the junction point of said second capacitor and said second resistor.

2. A saw-toothed wave generator comprising an electron discharge device including a cathode, a grid and an anode, a source of energizing potential having a positive terminal, an anode load impedance, said load impedance being connected between said anode and the positive terminal of said source, a first capacitor connected in circuit between said grid and said anode, a first resistor connected between said grid and the positive terminal of said source, means connected in shunt with the grid-cathode path of said discharge device for periodically biasing the potential of said grid with respect to said cathode beyond cutoff for short intervals of time, whereby a saw-tooth wave is developed between said anode and cathode electrodes, a second capacitor and a second resistor connected in series circuit between said anode and said cathode, said first capacitor having the end adjacent said anode connected to the junction point of said second capacitor and said second resistor, a third capacitor and a third resistor connected in the order named between said anode, and said cathode, said second capacitor and said third capacitor being substantially identical in magnitude, said second resistor and said third resistor being substantially identical in magnitude.

3. A saw-toothed wave generator comprising an electron discharge device including a cathode, a grid and an anode, a source of energizing potential having a positive terminal, an anode load impedance, said load impedance being connected between said anode and the positive terminal of said source, a first capacitor connected in circuit between said grid and said anode, a first resistor connected between said grid and the positive terminal of said source, means connected in shunt with the grid-cathode path of said discharge device for periodically biasing the potential of said grid with respect to said cathode beyond cutoff for short intervals of time, whereby a saw-tooth wave is developed between said anode and cathode electrodes, a second capacitor and a second resistor connected in series circuit between said anode and said cathode, said first capacitor having the end adjacent said anode connected to the junction point of said second capacitor and said second resistor, a third capacitor and a third resistor connected in the order named between said anode, and said cathode, said third capacitance having appreciable reactance in relation to the impedance of said third resistor at the fundamental frequency of the generator, said second capacitor and said third capacitor being substantially identical in magnitude, said second resistor and said third resistor being substantially identical in magnitude.

4. A saw-toothed wave generator comprising an electron discharge device including a cathode, a grid and an anode, a source of energizing potential having a positive terminal, an anode load impedance, said load impedance being connected between said anode and the positive terminal of said source, a first capacitor connected in circuit between said grid and said anode, a first resistor connected between said grid and the positive terminal of said source, means connected in shunt with the grid-cathode path of said discharge device for periodically biasing the potential of said grid with respect to said cathode beyond cutoff for short intervals of time, whereby a saw-tooth wave is developed between said anode and cathode electrodes, a second capacitor and a second resistor connected in series circuit between said anode and said cathode, said first capacitor having the end adjacent said anode connected to the junction point of said second capacitor and said second resistor, a third capacitor and a third resistor connected in the order named between said anode and said cathode, said second capacitor being less in magnitude than said third capacitor and said second resistor being greater in magnitude than said third resistor.

5. A saw-toothed wave generator comprising an electron discharge device including a cathode, a grid and an anode, a source of energizing potential having a positive terminal, an anode load impedance, said load impedance being connected between said anode and the positive terminal of said source, a first capacitor connected in circuit between said grid and said anode, a first resistor connected between said grid and the positive terminal of said source, means connected in shunt with the grid-cathode path of said discharge device for periodically biasing the potential of said grid with respect to said cathode beyond cutoff for short intervals of time, whereby a saw-tooth wave is developed between said anode and cathode electrodes, a second capacitor and a second resistor connected in series circuit between said anode and said cathode, said first capacitor having the end adjacent said anode connected to the junction point of said second capacitor and said second resistor, a third capacitor and a third resistor connected in the order named between said anode and said cathode, said second capacitor being greater in magnitude than said third capacitor and said second resistor being less in magnitude than said third resistor.

References Cited by the Examiner

UNITED STATES PATENTS 2,654,855   10/1953   Denton _____ 328—184

DAVID J. GALVIN, *Primary Examiner.*